US007976072B2

(12) United States Patent
Parrish

(10) Patent No.: US 7,976,072 B2
(45) Date of Patent: Jul. 12, 2011

(54) RECEPTACLE WITH ROTATING RELEASE LOCK

(75) Inventor: Joseph Edward Parrish, Goldsboro, NC (US)

(73) Assignee: Cooper Technologies Company, Houston, TX (US)

( * ) Notice: Subject to any disclaimer, the term of this patent is extended or adjusted under 35 U.S.C. 154(b) by 422 days.

(21) Appl. No.: 12/042,468

(22) Filed: Mar. 5, 2008

(65) Prior Publication Data

US 2008/0216525 A1 Sep. 11, 2008

Related U.S. Application Data

(60) Provisional application No. 60/905,187, filed on Mar. 6, 2007.

(51) Int. Cl.
*F16L 37/08* (2006.01)
*E05C 3/06* (2006.01)

(52) U.S. Cl. ......................... 285/312; 285/308; 285/321

(58) Field of Classification Search .................. 285/308, 285/309, 310, 311, 312, 321; 292/13, 19, 292/46, 83, 240, 256.65, 257, 304, 341.17; 24/634, 635; 403/353; 439/803, 806
See application file for complete search history.

(56) References Cited

U.S. PATENT DOCUMENTS 1,639,813 A * 8/1927 Schawrow ...................... 285/85
1,727,921 A * 9/1929 Adams .............................. 285/7
2,805,089 A * 9/1957 Hansen ......................... 285/317
3,065,005 A * 11/1962 Hall, Sr. et al. .................... 403/6
3,603,619 A * 9/1971 Bengesser et al. .............. 285/45
4,302,066 A 11/1981 Newman et al. .............. 439/347
5,269,586 A * 12/1993 Hahn et al. .................... 296/224
5,707,092 A * 1/1998 Van Slembrouck et al. ........................ 292/341.19
5,865,640 A 2/1999 Tadokoro ...................... 439/347
5,876,071 A * 3/1999 Aldridge ....................... 285/321
7,100,951 B2 * 9/2006 Jien .............................. 292/207
7,118,137 B2 * 10/2006 Deremiah ....................... 285/93
7,458,619 B2 * 12/2008 Cassel et al. .................. 285/420

OTHER PUBLICATIONS

Cooper Crouse-Hinds, Roughneck High Amperage Connectors, Crouse-Hinds Cam-Lok Connectors, 1998, 6 pgs.
Lee W. Young, Written Opinion of the International Searching Authority for PCT/US2008/056020, Jul. 22, 2008, pp. 1-4.

* cited by examiner

*Primary Examiner* — James M Hewitt
(74) *Attorney, Agent, or Firm* — King & Spalding LLP

(57) ABSTRACT

A connector for a high amperage, AC or DC connection comprises a plug and a receptacle configured to a securely mate and lock with each other. Connector receptacles comprise a locking mechanism having a bottom latch bracket having two slots, a top latch bracket having arcuate grooves and being pivotally coupled to the bottom latch bracket, and a latching rod configured to engage a plug and having guide pins extending through the slots and arcuate grooves. When the top latch bracket is in an unlocked position, the distance between the guide pins is at a maximum. Upon turning the top latch bracket, the guide pins move cooperatively within the arcuate grooves and the distance between the guide pins is minimized and the latching rod securely engages the plug.

34 Claims, 4 Drawing Sheets

RECEPTACLE WITH ROTATING RELEASE LOCK

CROSS-REFERENCE TO RELATED APPLICATIONS

The present application claims priority to U.S. Provisional Patent Application No. 60/905,187, entitled "Receptacle With Rotating Release Lock" and filed on Mar. 6, 2007, in the name of Joseph E. Parrish, the entire disclosure of which is hereby fully incorporated herein by reference.

TECHNICAL FIELD

The present application relates generally to locking mechanisms for receptacles. More particularly, the present application relates to a low-profile rotating latching lock for securing a plug within a receptacle.

BACKGROUND

Heavy duty connectors include receptacles and plugs for high power cable connections, and may be used, for example, in oil drilling applications. For instance, heavy duty connectors can safely carry power from generators to switch gear, selective catalytic reduction (SCR) packages, and traction motors, including mud pumps, draw works, rotary tables, cement pumps, and other offshore applications. Conventionally, once a high power plug is inserted into a receptacle, an external "U"-shaped clevis pin may be used to lock the plug in place and eliminate the possibility of accidental disengagement. Typically, the clevis pin is vertically inserted into a set of holes in the upper and lower portion of the receptacle and seated within a groove molded in the plug to positively lock the plug within the receptacle. However, the process of inserting the clevis pin into the receptacle to lock the plug in place may be cumbersome for the user since the clevis pin must be aligned with the set of holes in the upper and lower portion of the receptacle as well as the molded groove in the plug. Furthermore, since the clevis pin must be inserted vertically, a limited number of receptacles may be placed in a given area since clearance room is required to insert the clevis pin.

Therefore, a need exists for a receptacle having an improved locking mechanism that is easier to use and allows for a greater number of receptacles to be placed in a given area than conventional receptacles.

SUMMARY

The present invention relates to connectors having a unique locking mechanism for securing a plug within a receptacle. The locking mechanism is low-profile and can allow a greater number of connectors to be positioned in a given area compared to conventional connectors utilizing the "U"-shaped locking mechanism.

The connectors of the present invention include a plug and a receptacle. The receptacle includes a shell having an opening configured for receiving a plug. The shell includes a slot positioned on the upper portion of the shell and parallel to an entrance of the opening. A bottom latch bracket is coupled to shell and a top latch bracket is pivotally coupled to the bottom latch bracket. The bottom latch bracket has two slots that align with the slot in the upper portion of the shell. The top latch bracket has two arcuate grooves. A latching rod is included having guide pins that extend through the slot in the upper portion of the shell, the two bottom latch bracket slots, and the two arcuate grooves of the top latch bracket. The latching rod also includes a circular portion that engages a groove on a plug when the top latch bracket is rotated 90° causing the guide pins cooperatively to move closer together through the arcuate grooves. In some aspects, the shell may include two holes opposite the slot in the upper portion of the shell, and the latching rod may be segmented into two parts, each having a semi-circular portion for engaging a plug and a lower portion that extends into the holes in the shell. In some aspects, the top latch bracket may include a protrusion positioned such that it aligns with and engages one of two dimples or recesses in the bottom latch bracket to prevent accidental unlocking of the locking mechanism.

These and other aspects, objects, features, and embodiments of the present invention will become apparent to those having ordinary skill in the art upon consideration of the following detailed description of illustrative embodiments exemplifying the best mode for carrying out the invention as presently perceived.

BRIEF DESCRIPTION OF THE DRAWINGS

The present invention may be better understood by reading the following description of non-limitative embodiments with reference to the attached drawings wherein like parts of each of the several figures are identified by the same reference characters, and which are briefly described as follows.

DETAILED DESCRIPTION OF EXEMPLARY EMBODIMENTS

The invention provides a low-profile rotating latching lock for a receptacle. The receptacle can be designed to enclose conduit and electrical cabling, as well as to restrict the entry of moisture when in the locked position. Generally, the latching lock provides a safe yet easy means of joining cable.

Figure 1:
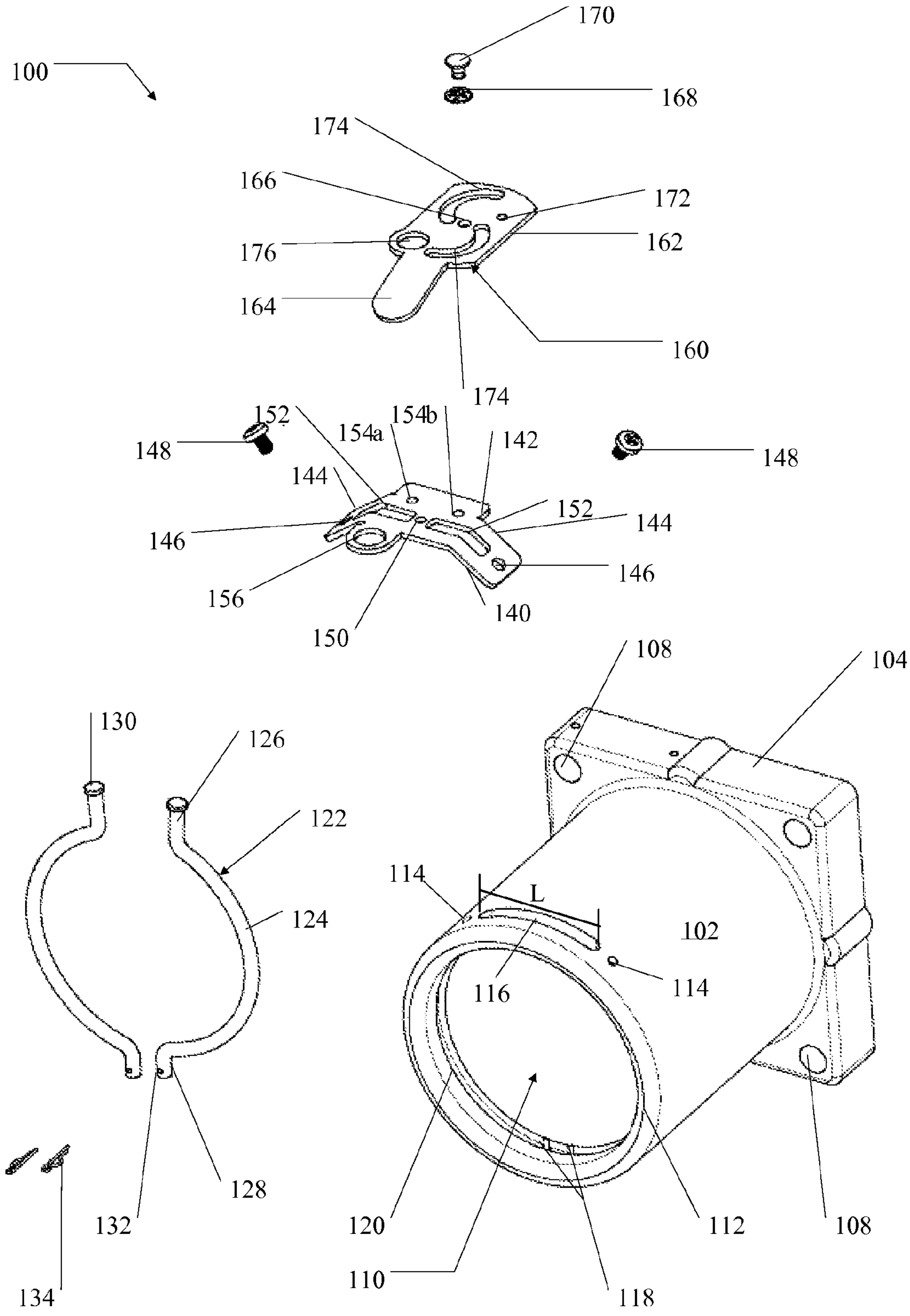
FIG. 1 is an exploded view of a receptacle having a locking latch according to an exemplary embodiment.
Figure 6:
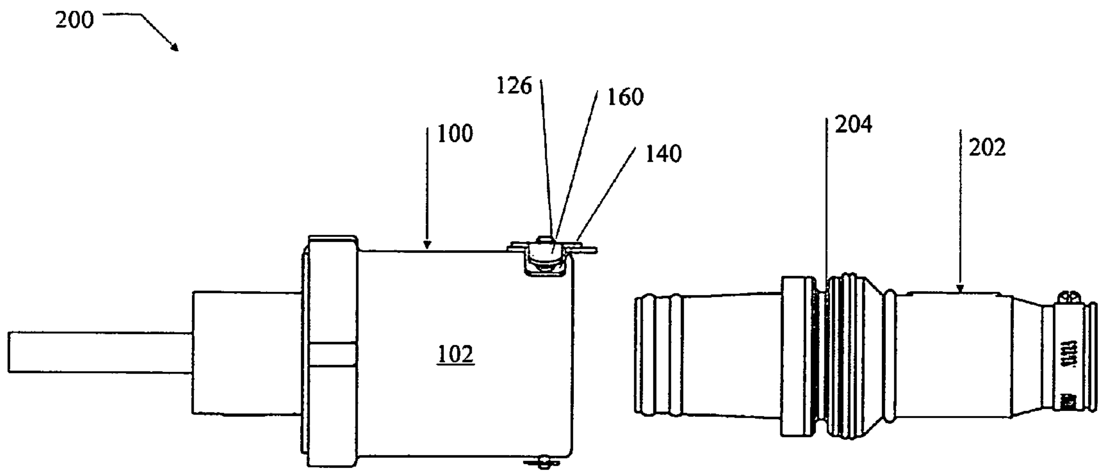
FIG. 6 is a side view of a connector showing the receptacle of FIG. 1 having a locking latch in the unlocked position and a plug disconnected according to an exemplary embodiment.
Figure 7:
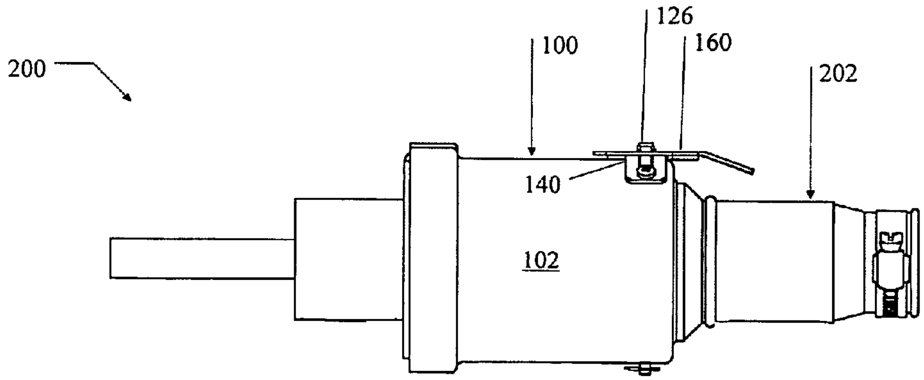
FIG. 7 is a side view of the connector of FIG. 6 showing the receptacle of FIG. 1 and the plug of FIG. 6 fully connected according to an exemplary embodiment.

FIG. 1 illustrates an exploded view of a receptacle 100 according to an exemplary embodiment. The receptacle 100 comprises a cylindrical shell 102 having a mounting flange 104 at a first end 106. The mounting flange 104 may include apertures 108 for receiving, for example, screws or threaded rods (not shown) for attachment to a base, wall, or other structure (not shown). The cylindrical shell 102 also comprises an opening 110 extending from a second end 112 of the cylindrical shell 102 towards the mounting flange 104. The opening 110 may be adapted to receive a cap (not shown) or a plug 202 (FIG. 6-7). The mounting flange 104 also can comprise an opening (not shown) corresponding to the opening 110.

Figure 2:
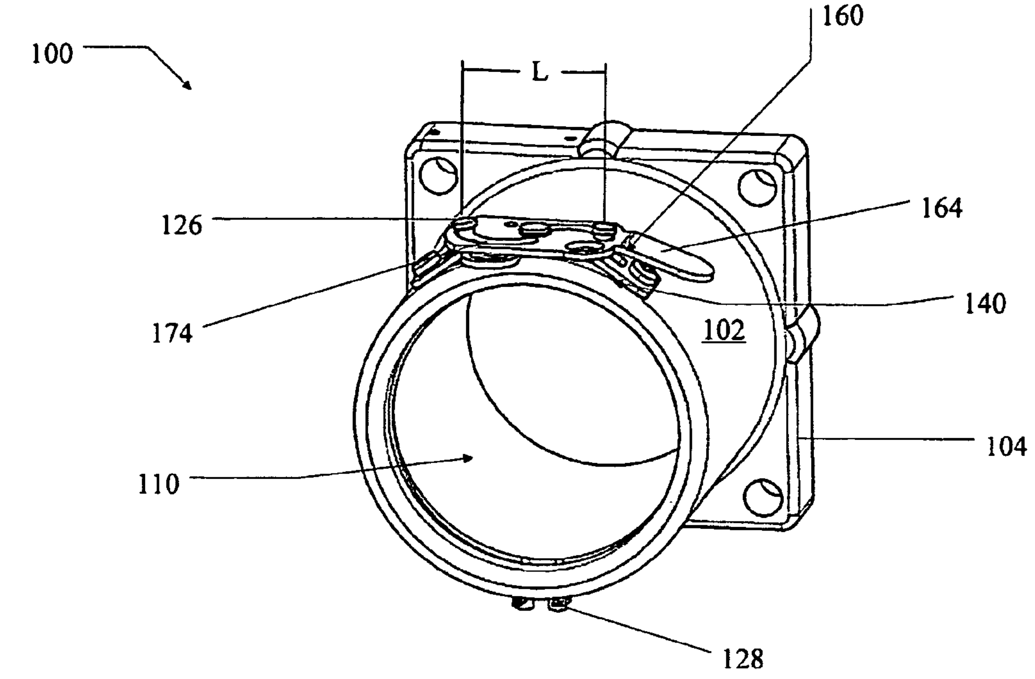
FIG. 2 is perspective view of the receptacle of FIG. 1 having a locking latch in the unlocked position according to an exemplary embodiment

Proximate the second end 112 and on the upper portion (as illustrated in FIG. 1) of the cylindrical shell 102, the receptacle 100 comprises two apertures 114 positioned on either side of a slot 116 having a length L. On the lower portion (as illustrated in FIG. 2) of the cylindrical shell 102 and proximate the second end 112, the cylindrical shell 102 comprises two recesses or apertures 118 positioned proximate each other. Cylindrical shell 102 also comprises a channel 120 within the opening 110 and proximate the second end 112.

The receptacle 100 further comprises two latching rods (or retaining rods) 122. Each of the latching rods 122 has a central portion 124 that is semi-circular in shape with an upper portion (or guide pin) 126 and a lower portion (or anchor pin) 128 extending from opposite sides of the central portion 124. The latching rods 122 are positioned within the channel 120 of the cylindrical shell 102. The upper portion 126 of each latching rod 122 extends through the slot 116 and protrudes on an opposite side of the receptacle 102. In certain exemplary embodiments, each latching rod 122 may include a cap or segment 130 that is larger in size (for example, diameter) than the upper portion 126 so as to prevent the upper portion 126 from accidentally sliding into the opening 110. The cap 130 can be formed on or added to the upper portion 126 after the latching rod 122 is engaged with the latch bracket (discussed hereinafter). The lower portion 128 of each latching rod 122 extends into or through one of the recesses or apertures 118 on the cylindrical shell 102. In certain exemplary embodiments, the lower portion 128 of each latching rod 122 may comprise an aperture 132 in which a cotter pin 134 may be placed to prevent the lower portion 128 from accidentally sliding back into the opening 110.

The receptacle 100 further comprises a bottom (as illustrated in FIG. 1) latch bracket 140. The bottom latch bracket 140 comprises a flat central portion 142 and two angled flanges 144 extending from opposite sides of the central portion 142. In alternative embodiments, the bottom latch bracket 140 may be curved or otherwise correspond to the shape of the receptacle 100. The bottom latch bracket 140 comprises two apertures 146 that align with the apertures 114 of the cylindrical shell 102. In an exemplary embodiment, screws 148 may be placed through apertures 146 of the bottom latch bracket 140 and apertures 114 of the cylindrical shell 102 to secure the bottom latch bracket 140 to the cylindrical shell 102. In certain exemplary embodiments, the screws 148 may be replaced with any other suitable fasteners.

The bottom latch bracket 140 comprises a central aperture 150 positioned substantially in the center of the central portion 142. Two slots 152 are positioned on either side of the central aperture 150. The upper portions 126 of each latching rod 122 project through the slots 152 of the bottom latch bracket 140. The bottom latch bracket 140 also may comprise dimples 154*a*, 154*b* positioned proximate the slots 152 on one side and an eyelet 156 positioned proximate the slots 152 on the opposite side from the dimples 154. As used herein, the term "eyelet" may refer to any aperture, perforation, or hole suitable for accepting a locking mechanism, such as a fastening cord or a lock.

The receptacle 100 further comprises a top latch bracket 160. The top latch bracket 160 comprises a base portion 162 with a handle 164 extending therefrom. The handle 164 facilitates rotating the top latch bracket 160 by 90°, thereby allowing the receptacle 100 to be alternately locked and unlocked. In certain exemplary embodiments, the handle 164 may be angled downward from the base portion 162. In alternative-exemplary embodiments, the handle 164 may be level with or angled upward from the base portion 162.

The base portion 162 of the top latch bracket 160 comprises a central aperture 166 that aligns with the central aperture 150 of the bottom latch bracket 140. A clover spring 168 rests in the central apertures 166, 150 of the top and bottom latch brackets 160, 140. A solid shoulder rivet 170 rests above the top latch bracket 160 and through the clover spring 168 and the central apertures 166, 150. The torsional force on the clover spring 168 causes the clover spring 168 to be compressed or stretched and facilitates the locking and unlocking of the receptacle 100.

In certain exemplary embodiments, the top latch bracket 160 may comprise a protrusion 172 that protrudes downward. The protrusion 172 is positioned such that it aligns with and engages the dimple 154*a* of the bottom latch bracket 140 when the top latch bracket 160 is parallel lengthwise to the bottom latch bracket 140 (unlocked position), and aligns with and engages the dimple 154*b* of the bottom latch bracket 140 when the top latch bracket 160 is perpendicular lengthwise to the bottom latch bracket 140 (locked position). The protrusion 172 offers resistance and positive location when engaged with one of the dimples 154*a*, 154*b*. In the event that the receptacle is inadvertently moved (for example, by knocking or vibration), the positive engagement of the protrusion 172 with the dimple 154*b* lessens the risk of the receptacle 100 becoming accidentally unlocked.

The top latch bracket 160 further comprises two complementary arcuate grooves 174 proximate to and extending outward from near the aperture 166. At least a portion of each of the arcuate grooves 174 is aligned with the slot 116 of the cylindrical shell 102 and the slots 152 of the bottom latch bracket 140. Each of the complementary arcuate grooves 174 engages the upper portion 126 of its corresponding latching rod 122. When the top latch bracket 160 is parallel to the bottom latch bracket 140 (unlocked position), the upper portions 126 of the latching rods 122 are positioned such that the distance between the two upper portions 126 is at a maximum, or separated by the distance L (FIGS. 2-3) of the slot 116, thereby pushing the upper portions 126 of the latching rods 122 apart, and in turn pushing the central portions 124 of the latching rods 122 apart from the plug 202 (FIGS. 6-7) so that the plug 202 may be inserted or removed. When the top latch bracket 160 is perpendicular to the bottom latch bracket 140 (locked position), the upper portions 126 of the latching rods 122 are positioned such that the distance between the two upper portions 126 is minimized (FIGS. 4-5), thereby pulling the upper portions 126 of the latching rods 122 together, and in turn pulling the central portions 124 of the latching rods 122 closer together to engage the plug 202 such that the plug 202 is locked within the receptacle 100.

The top latch bracket 160 further comprises an eyelet 176. When the top latch bracket 160 is perpendicular to the bottom latch bracket 140 (locked position), the eyelet 156 of the bottom latch bracket 140 cooperatively aligns with the eyelet 176 of the top latch bracket, thereby allowing a lock (not shown) to be inserted into the two cooperating eyelets 156, 176.

Figure 3:
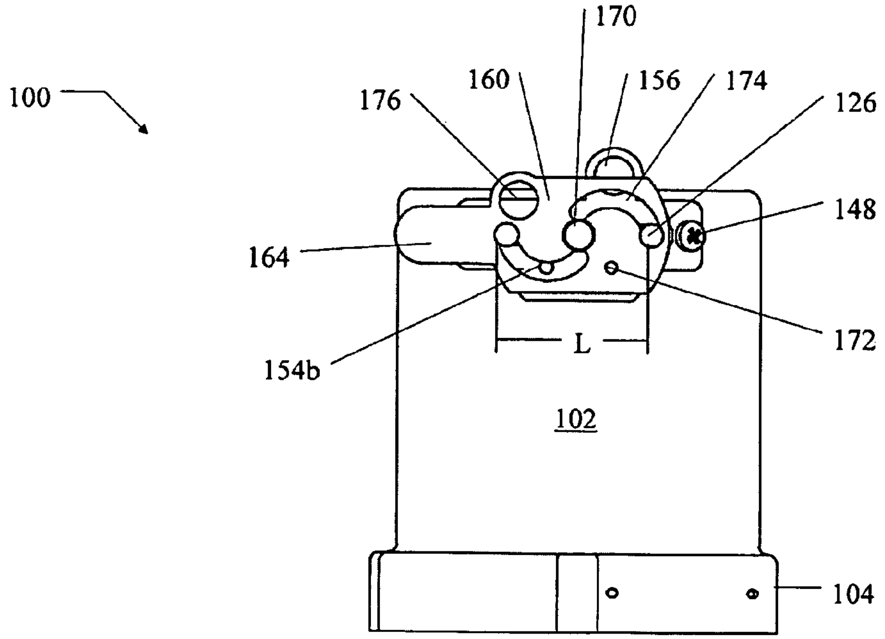
FIG. 3 is a top view of the receptacle of FIG. 1 having a locking latch in the unlocked position according to an exemplary embodiment.

FIGS. 2-3 illustrate an assembled view of the receptacle 100 in the unlocked position. The top latch bracket 160 is aligned parallel to the bottom latch bracket 140 and the distance between the upper portions 126 of the latching rods 122 is at a maximum of L (which can be as long as the length of the slot 116 in the cylindrical shell 102).

Figure 4:
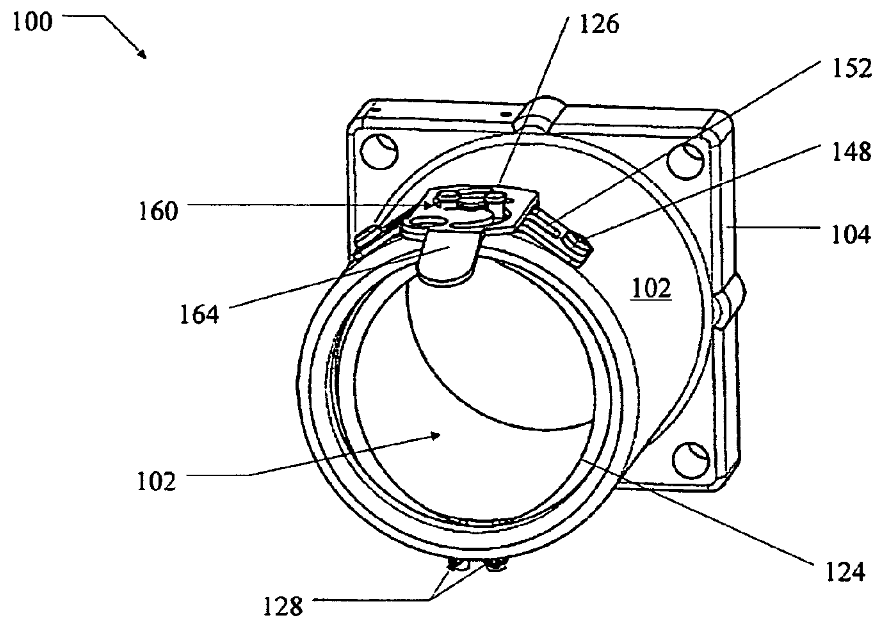
FIG. 4 is a perspective view of the receptacle of FIG. 1 having a locking latch in the locked position according to an exemplary embodiment.
Figure 5:
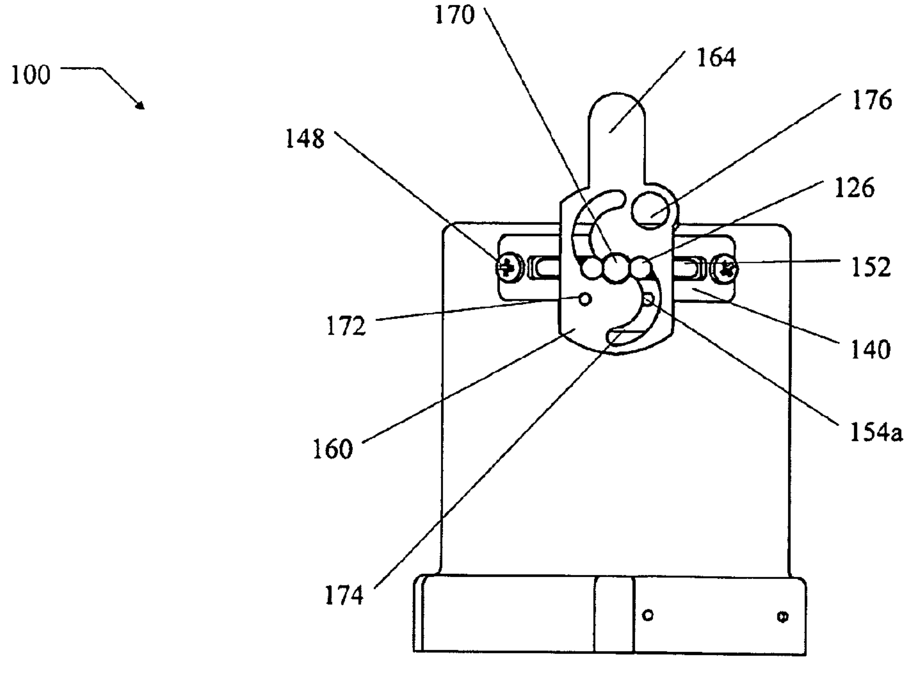
FIG. 5 is a top view of the receptacle of FIG. 1 having a locking latch in the locked position according to an exemplary embodiment.

FIGS. 4-5 illustrate an assembled view of the receptacle 100 in the locked position. The top latch bracket 160 has been rotated 90° relative to the unlocked position and is aligned perpendicular to the bottom latch bracket 140. Rotation of the top latch bracket 160 causes the arcuate grooves 174 to cooperatively bring the upper portions 126 of the latching rods 122 closer together, thereby causing the circumference of the latching rods 122 to decrease. Decreasing the circumference of the latching rods 122 allows the latching rods 122 to engage the plug 202 (FIGS. 6-7) or cap (not shown) which may be inserted into the opening 110 of the receptacle 100, and is described in further detail below with respect to FIGS. 6-7. Additionally, the top latch bracket 160 eyelet 176 and the bottom latch bracket 140 eyelet 156 are in cooperative alignment when in the locked position, thus providing a mechanism for securing the receptacle 100 in a locked position with a padlock or similar device (not shown).

FIG. 6 illustrates a connector 200 in a disconnected state. The connector 200 comprises the receptacle 100 and a plug 202. The top latch bracket 160 is aligned parallel to the bottom latch bracket 140 and is in the unlocked position. The plug 202 comprises a lip or groove 204 configured to engage with the central portions 124 of the latching rods 122. The connector 200 may be used in any suitable location for joining a receptacle and a plug or other components, particularly wherever a high amperage, AC or DC connection is required.

FIG. 7 illustrates the connector 200 with the receptacle 100 and the plug 202 connected to each other. The plug 202 is inserted into the opening 110 of the cylindrical shell 102 of the receptacle 100. The top latch bracket 160 is rotated 90° relative to the unlocked position and is aligned perpendicular to the bottom latch bracket 140. The arcuate grooves 174 cooperatively bring the upper portions 126 of the latching rods 122 closer together and cause the central portions 124 of the latching rods 122 to engage the groove 204 of the plug 202 to create a latching force around the plug 202. In an exemplary embodiment, the plug 202 and the receptacle 100 can mate to provide a water tight seal, and the components are held together via the latching force. In certain exemplary embodiments where the receptacle 100 is not in use, the plug 202 may be replaced with an end cap (not shown) having a corresponding lip or groove for engaging with the central portions 124 of the latching rods 122 and creating a similar water-tight seal.

Furthermore, since the described configuration eliminates the need for the "U"-shaped clevis pin conventionally used to lock a plug within a receptacle, an increased number of receptacles may be mounted in a given area over conventional receptacles.

As described herein, the present invention is well adapted to attain the ends and advantages mentioned, as well as those that are inherent therein. The particular embodiments disclosed above are illustrative only, as the present invention may be modified and practiced in different but equivalent manners apparent to those having ordinary skill in the art having the benefit of the teachings provided herein. Having described some exemplary embodiments of the present invention, it is believed that the use of alternate receptacles having a similar locking mechanism is within the purview of those having ordinary skill in the art. For example, the holes or apertures in the bottom of the cylindrical shell may be spaced further apart and the latching rods may be correspondingly adjusted. Also, the bottom latch bracket may include one long slot as opposed to two slots. Furthermore, the latching mechanism may be positioned on alternate areas (for example, side, bottom) of the receptacle and the corresponding holes and slots may be placed accordingly. Additionally, while the present application illustrates generally cylindrical receptacles and plugs, it is understood that a number of other non-circular configurations may be used and the latching mechanism may be configured to correspond with the shape of the receptacle and plug. Furthermore, the two semi-circular latching rods may be replaced by a single continuous latching rod having a generally circular portion and two upper portions for extending through the upper portion of the receptacle.

Any spatial references herein such as, for example, "top," "bottom," "upper," "lower," "above," "below," "rear," "between," "vertical," "angular," "beneath," etc., are for the purpose of illustration only and do not limit the specific orientation or location of the described structure.

While numerous changes may be made by those having ordinary skill in the art, such changes are encompassed within the spirit and scope of this invention as defined by the appended claims. Furthermore, no limitations are intended to the exemplary details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. A receptacle, comprising:

a shell having an opening and a first slot disposed therein;

a first latch bracket coupled to shell, the first latch bracket comprising at least one second slot aligned with the first slot;

a second latch bracket pivotally coupled to the first latch bracket, the second latch bracket comprising:

a first elongated arcuate groove comprising a first end, a first distal end, and a first radius of curvature between the first end and the first distal end; and a second elongated arcuate groove comprising a second end, a second distal end, and a second radius of curvature between the second end and the second distal end; and a latching mechanism positioned within the shell and comprising at least one latching rod, the latching mechanism having a first guide pin and a second guide pin, the first guide pin extending through the first slot, the at least one second slot, and the first elongated arcuate groove, and the second guide pin extending through the first slot, the at least one second slot, and the second elongated arcuate groove.

2. The receptacle of claim 1, wherein the opening is adapted to receive a plug therein.

3. The receptacle of claim 2, further comprising a plug, the plug comprising a groove configured to engage with the latching mechanism.

4. The receptacle of claim 1, wherein the first latch bracket comprises a first eyelet, and wherein the second latch bracket comprises a second eyelet positioned so as to align with the first eyelet when the first and the second latch brackets are in a locked position.

5. The receptacle of claim 1, wherein the at least one second slot comprises two second slots, and wherein each of the first and second guide pins extends through a corresponding one of the two second slots.

6. The receptacle of claim 5, wherein the first latch bracket comprises a first central aperture positioned between the two second slots, and wherein the second latch bracket comprises a second central aperture positioned between the first elongated arcuate groove and the second elongated arcuate groove.

7. The receptacle of claim 6, further comprising a fastener seated in the first central aperture and the second central aperture.

8. The receptacle of claim 1, wherein the first latch bracket comprises at least one dimple and the second latch bracket comprises a protrusion configured to engage the at least one dimple.

9. The receptacle of claim 1, wherein the shell comprises two receiving locations positioned opposite the first slot, and wherein the latching mechanism comprises two latching rods, each latching rod having a semi-circular central portion and a lower anchor pin configured to engage with a corresponding one of the receiving locations.

10. The receptacle of claim 9, wherein the two receiving locations are apertures, wherein the anchor pins extend through the apertures and out of the shell, and wherein each of the anchor pins comprises a hole in a latching rod segment extending out of the shell, the hole configured to receive a cotter pin.

11. The receptacle of claim 1, wherein at least one of the first guide pin and the second guide pin further comprises a cap disposed thereon.

12. The receptacle of claim 1, wherein the latching mechanism comprises a first portion separate from a second portion, wherein the first portion comprises the first guide pin and the second portion comprises the second guide pin.

13. A connector, comprising:

a plug comprising a groove around at least a portion of its exterior; and a receptacle comprising a shell having an opening and a first slot disposed therein;

a first latch bracket coupled to shell, the first latch bracket comprising at least one second slot aligned with the first slot;

a second latch bracket pivotally coupled to the first latch bracket, the second latch bracket comprising;

a first elongated arcuate groove comprising a first end, a first distal end, and a first radius of curvature between the first end and the first distal end; and a second elongated arcuate groove comprising a second end, a second distal end, and a second radius of curvature between the second end and the second distal end; and a latching mechanism positioned within the shell and comprising at least one latching rod, the latching mechanism having a first guide pin and a second guide pin, the first guide pin extending through the first slot, the at least one second slot, and the first elongated arcuate groove, and the second guide pin extending through the first slot, the at least one second slot, and the second elongated arcuate groove, wherein the latching mechanism aligns with the groove when the plug is inserted into the opening of the receptacle.

14. The connector of claim 13, wherein the latching mechanism engages the groove when the distance between the first guide pin and the second guide pin is at a minimum.

15. The connector of claim 14, wherein the latching mechanism engages the groove to form a water-tight seal.

16. The connector of claim 13, wherein the connector is in an unlocked state when the distance between the first guide pin and the second guide pin is at a maximum.

17. The connector of claim 13, wherein the first latch bracket comprises a first eyelet, and wherein the second latch bracket comprises a second eyelet positioned so as to align with the first eyelet when the first and the second latch brackets are in a locked position.

18. The connector of claim 13, wherein the at least one second slot comprises two second slots, and wherein each of the first and second guide pins extends through a corresponding one of the two second slots.

19. The connector of claim 18, wherein the first latch bracket comprises a first central aperture positioned between the two second slots, and wherein the second latch bracket comprises a second central aperture positioned between the first elongated arcuate groove and the second elongated arcuate groove.

20. The connector of claim 19, further comprising a fastener seated in the first central aperture and the second central aperture.

21. The connector of claim 13, wherein the first latch bracket comprises at least one dimple and the second latch bracket comprises a protrusion configured to engage the at least one dimple.

22. The connector of claim 13, wherein the shell comprises two receiving locations positioned opposite the first slot, and wherein the latching mechanism comprises two latching rods, each latching rod having a semi-circular central portion and a lower anchor pin configured to engage with a corresponding one of the receiving locations.

23. The connector of claim 22, wherein the two receiving locations are apertures, wherein the anchor pins extend through the apertures and out of the shell, and wherein each of the anchor pins comprises a hole in a latching rod segment extending out of the shell, the hole configured to receive a cotter pin.

24. The connector of claim 13, wherein at least one of the first guide pin and the second guide pin further comprises a cap disposed thereon.

25. The connector of claim 13, wherein the latching mechanism comprises a first portion separate from a second portion, wherein the first portion comprises the first guide pin and the second portion comprises the second guide pin.

26. A latch, comprising:

a first latch bracket comprising at least one slot;

a second latch bracket pivotally coupled to the first latch bracket, the second latch bracket comprising:

a first elongated arcuate groove comprising a first end, a first distal end, and a first radius of curvature between the first end and the first distal end; and a second elongated arcuate groove comprising a second end, a second distal end, and a second radius of curvature between the second end and the second distal end; and a latching mechanism comprising at least one latching rod, the latching mechanism having a first guide pin and a second guide pin, the first guide pin extending through the at least one slot and into the first elongated arcuate groove, and the second guide pin extending through the at least one slot and into the second elongated arcuate groove.

27. The latch of claim 26, wherein the latch is in an unlocked state when the distance between the first guide pin and the second guide pin is at a maximum.

28. The latch of claim 26, wherein the latch is in a locked state when the distance between the first guide pin and the second guide pin is at a minimum.

29. The latch of claim 26, wherein the first latch bracket comprises a first eyelet, and wherein the second latch bracket comprises a second eyelet positioned so as to align with the first eyelet when the first and the second latch brackets are in a locked position.

30. The latch of claim 26, wherein the at least one slot comprises two slots, and wherein each of the first and second guide pins extends through a corresponding one of the two slots.

31. The latch of claim 26, wherein the first latch bracket comprises at least one dimple and the second latch bracket comprises a protrusion configured to engage the at least one dimple.

32. The latch of claim 26, wherein at least one of the first guide pin and the second guide pin further comprises a cap disposed thereon.

33. The latch of claim 26, further coupled to an exterior of a receptacle.

34. The latch of claim 26, wherein the latching mechanism comprises a first portion separate from a second portion, wherein the first portion comprises the first guide pin and the second portion comprises the second guide pin.

* * * * *